United States Patent [19]
Nagano

[11] Patent Number: 5,078,664
[45] Date of Patent: Jan. 7, 1992

[54] SPEED CHANGE HUB AND BRAKING CONSTRUCTION

[75] Inventor: Masashi Nagano, Izumi, Japan

[73] Assignee: Shimano Industrial Co., Ltd., Osaka, Japan

[21] Appl. No.: 480,609

[22] Filed: Feb. 15, 1990

[30] Foreign Application Priority Data

Feb. 17, 1989 [JP] Japan .................. 1-39099

[51] Int. Cl.⁵ .............................. F16H 3/44
[52] U.S. Cl. ......................... 475/297; 475/296; 475/314
[58] Field of Search ............... 475/269, 270, 271, 280, 475/288, 296, 297, 298, 300, 311, 314

[56] References Cited

U.S. PATENT DOCUMENTS

| | | | |
|---|---|---|---|
| 1,045,236 | 11/1912 | Winkler | 475/288 |
| 2,301,852 | 9/1941 | Brown | 475/300 |
| 2,441,989 | 5/1948 | Brown | 475/314 |
| 3,995,503 | 12/1976 | Schulz | 475/297 |
| 4,651,853 | 3/1987 | Bergels | 475/297 |
| 4,721,013 | 1/1988 | Steuer et al. | 475/300 |
| 4,727,965 | 3/1988 | Zach et al. | 475/297 |

FOREIGN PATENT DOCUMENTS

| | | |
|---|---|---|
| 2458871 | 12/1973 | Fed. Rep. of Germany . |
| 53-14820 | 5/1978 | Japan . |
| 733595 | 7/1955 | United Kingdom . |
| 2014260A | 8/1979 | United Kingdom . |
| 216503A | 5/1986 | United Kingdom . |
| 2166502A | 5/1986 | United Kingdom . |

Primary Examiner—Leslie A. Braun
Assistant Examiner—Ryan W. Massey
Attorney, Agent, or Firm—Dickstein, Shapiro & Morin

[57] ABSTRACT

A change-speed hub having a fixed shaft, a hub body rotatably mounted on the fixed shaft, a drive member rotatably mounted on the fixed shaft for transmitting a drive force to the hub body selectively through a plurality of transmission channels, a clutch for selecting one from the transmission channels, a plurality of sun gears rotatably mounted on the fixed shaft and having diameters differing from each other and a lock control mechanism for controlling locking and releasing of the sun gears relative to the fixed shaft. The sun gears have axial movements thereof substantially limited. On the fixed shaft, there is rotatably mounted a control member. The control member includes a first control portion for controlling the clutch and second and third control portions for activating the lock control mechanism for selectively locking the sun gears to the fixed shaft. The control member is operable externally of the hub body for providing a plurality of speeds through the selection of the transmission channel and the selection of the sun gear to be located by the lock control mechanism.

16 Claims, 12 Drawing Sheets

1

SPEED CHANGE HUB AND BRAKING CONSTRUCTION

BACKGROUND OF THE INVENTION

1. Field of the Invention

The present invention relates to a speed-change hub for use in e.g. a bicycle, and more particularly to a speed-change hub including a fixed shaft, a hub body rotatably mounted on the fixed shaft, a drive member rotatably mounted on the fixed shaft for transmitting a drive force to the hub body selectively through a plurality of transmission channels and a clutch for selecting one of the transmission channels.

2. Description of the Related Art

A known speed-change hub of the above-specified type includes first and second sun gears rotatable relative to a fixed shaft and having different diameters and a lock control mechanism for locking the sun gears to and releasing the same from the fixed shaft. The fixed shaft further includes an axially movable first control portion having a control portion for controlling a clutch element and externally operable at one distal end of the hub body and an axially movable second control portion having a control portion for activating the lock control mechanism to lock either the first or second sun gear to the fixed shaft. Accordingly, by moving the first control portion, the clutch is operated to select a desired transmission channel. Also, by moving the second control portion, one of the first and second sun gears is locked to the fixed shaft. In this way, the hub provides a plurality of speeds (Japanese published patent gazette No. 53-14820).

Recently, the prior art has suggested a further type of speed-change hub having only one one control portion (West Germany laid-open patent gazette No. 2458871). With this speed-change hub, the control portion is rotated to axially move a sun gear and a planet gear meshing therewith.

One problem occurs with the above speed-change hub however. That is, since the speed-changing operation is effected by operating the sun gear and the planet gear which are being rotated in union (more particularly, the planet gear, the sun gear and also the hub body are acting on each other), the control portion tends to be subjected to a relatively large load which results in a 'heavy' speed-change operation feel. In this sense, this speed-change hub still has room for improvement.

The present invention attends to the abovedescribed drawback of the prior art. Hence, the invention's primary object is to provide an improved speed-change hub which provides a light speed-changing operation feel to the user because of an effectively reduced load acting on the control portion of the hub.

SUMMARY OF THE INVENTION

For accomplishing the above-noted object, the invention provides in a speed-change hub comprising: a fixed shaft; a hub body rotatably mounted on the fixed shaft; a drive member rotatably mounted on the fixed shaft for transmitting a drive force to the hub body selectively through a plurality of transmission channels; a clutch for selecting one of the transmission channels; a plurality of sun gears rotatably mounted on the fixed shaft and having diameters differing from each other; a lock control mechanism for controlling locking and releasing of the sun gears relative to the fixed shaft, sun gears having axial movements which are substantially limited; and a control member rotatably mounted on the fixed shaft, the control member including a first control portion for controlling the clutch and second and third control portions for activating the lock control mechanism for selectively locking the sun gears to the fixed shaft, the control member being operable externally of the hub body for providing a plurality of speeds through the selection of the transmission channel and the selection of the sun gear to be locked by the lock control mechanism.

Functions and effects of the above construction will now be described.

As the control member is rotatably operated (or moved axially), the first control portion acts to select the transmission channel while the second and third control portions act to select the sun gear to be locked by the lock control mechanism.

As described above, the invention's speed-change hub includes the sun gears having different diameters, the lock control mechanism for controlling locking and releasing of the sun gears relative to the fixed shaft and the clutch for selecting the transmission channel from the drive member to the hub body. Yet, with the above-described construction, the selection of the transmission channel and also that of the sun gears to be locked to the fixed shaft can both be effected by the very simple rotational operation of the control member. Consequently, the speed-change hub of the invention provides a light operational feel and also reliable and error-free operation.

Further, in a braking construction used in a speed-change hub having a fixed shaft, a hub body rotatably mounted on the fixed shaft, a drive member rotatably mounted on the fixed shaft for transmitting a drive force to the hub body selectively through a plurality of transmission channels, clutches for selecting one of the transmission channels and a braking mechanism for releasing engagement between the drive member and the hub body through reverse rotation of the drive member relative to a driving direction, the mechanism including a braking member for braking rotation of said hub body, the braking construction of the present invention is characterized in that the releasing action of the engagement between the drive member and the hub body is effected through an interaction of a plurality of transmission claws supported to the drive member.

The above-described braking constructon achieves an easy operation while maintaining the light speed-change operation feel of the hub body rotation.

Further and other objects, features and effects of the invention will become more apparent from the following more detailed description of the embodiments of the invention taken with reference to the accompanying drawings.

BRIEF DESCRIPTION OF THE DRAWINGS

FIGS. 25 through 26 are partial section views illustrating engaging relationship between the ring gear and the drive member of the arrangement of FIG. 24; in which, FIGS. 25(a) and 25(b) are views showing the ring gear being engaged with the drive member through a transmission claw, FIGS. 26(a) and 26(b) are views showing a condition where the ring gear and the drive member break the power transmission, FIG. 27 is a partially enlarged front view showing a ring gear and a drive member of a still further modified arrangement when the drive member is rotated reversely, FIGS. 28 through 29 are partial section views illustrating engagement relationship between the ring gear and the drive member of the arrangement of FIG. 27, FIGS. 25 through 26 are partial section views illustrating engaging relationship between the ring gear and the drive member of the arrangement of FIG. 24; in which, FIGS. 28 through 29 are partial section views illustrating engagement relationship between the ring gear and the drive member of the arrangement of FIG. 27; in which.

DESCRIPTION OF THE PREFERRED EMBODIMENTS

Preferred embodiments of the present invention will be now described in particular with reference to the accompanying drawings.

Figure 1:
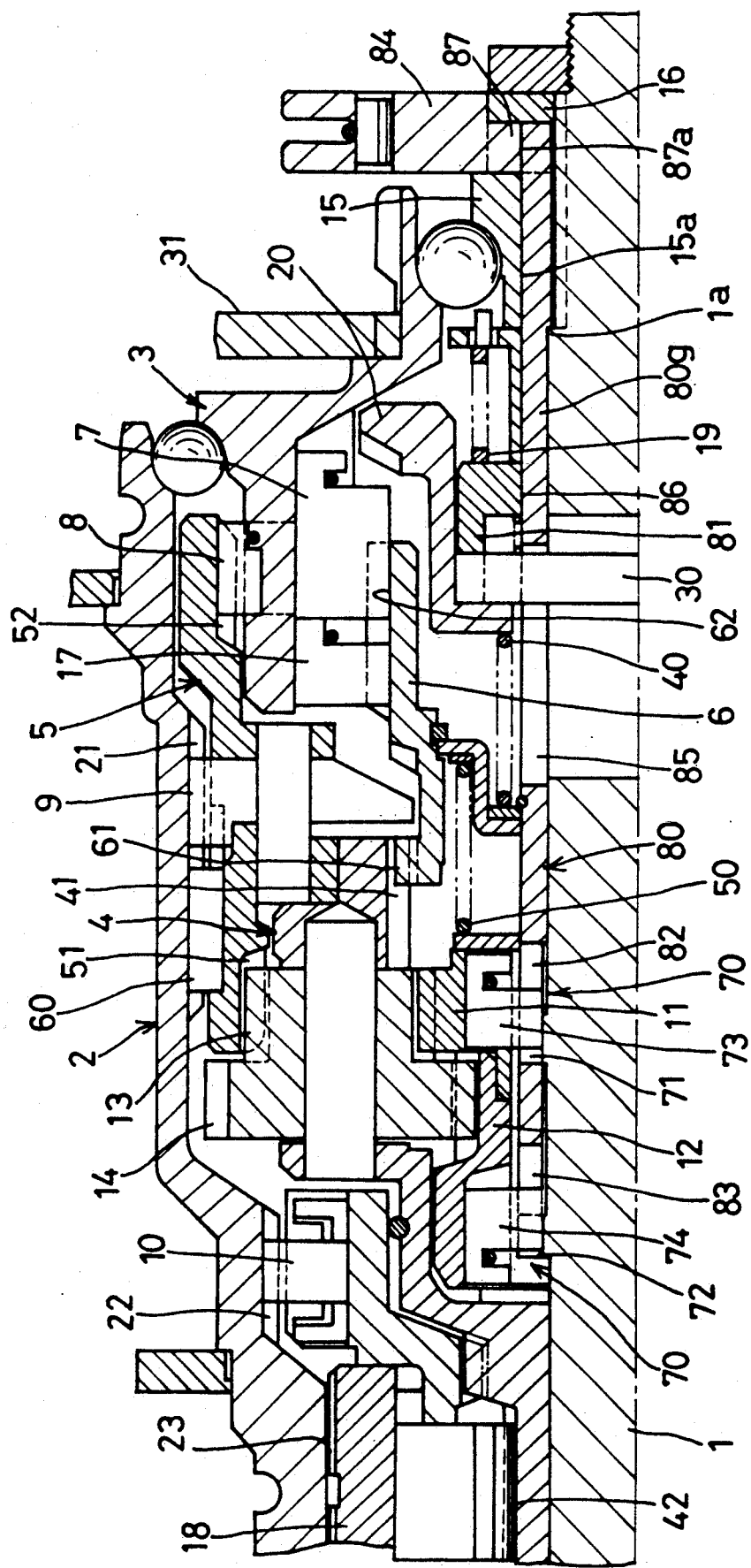
FIG. 1 is a partially cutaway front view showing a speed-change hub relating to one preferred embodiment of the present invention.

FIG. 1 shows a five-speed, speed-change hub capable of providing two high speeds, one middle speed and two low speeds for use in a bicycle. This change-speed hub mainly includes a fixed shaft 1 to be fixed to a bicycle frame, a cylindrical hub body 2 rotatably mounted on the fixed shaft 1, a drive member 3 rotatably mounted on the fixed shaft 1, a cylindrical gear carrier 4 accommodated in the hub body 2 and carrying planet gears meshing with sun gears to be described later, a ring gear 5 accommodated in the hub body 2 and having an internal gear 51 meshable with the planet gears, a relay member 6 for relaying a rotational force from the drive member 3 to the gear carrier 4, a first transmission claw 7 projectably and retractably disposed between the drive member 3 and the relay member 6, a second transmission claw 8 projectably and retractably disposed between the drive member 3 and the ring gear 5, a third transmission claw 9 projectably and retractably disposed between the hub body 2 and the ring gear 5 and a fourth transmission claw 10 projectably and retractably disposed between the hub body 2 and the gear carrier 4. Further, a clutch 20 is provided for selectively transmitting the force of the drive member 3 either through a transmission channel via the gear carrier 4 to the hub body 2 or through a further transmission channel via the ring gear 5 to the hub body 2 without passing the gear carrier 4.

At a longitudinal middle position of the fixed shaft 1, there is provided a key 30 axially movable within an elongated slot extending radially. On an inner peripheral face of the hub body 2, there are provided a first ratchet 21 engageable with the third transmission claw 9 and a second ratchet 22 engageable with the fourth transmission claw 10, with the ratchets 21 and 22 being disposed with a predetermined axial distance therebetween.

At one distal external end of the drive member 3, there is provided a chain gear 31 engageable with a drive chain of the bicycle. At a longitudinal intermediate position of the drive member 3, there is supported the second transmission claw 8. Whereas, the first transmission claw 7 is supported to the inner peripheral face of the drive member 3, with the claw 7 being urged toward the relay member 6 by means of a claw spring. Also, the second transmission claw 8 is urged to the inner peripheral face of the ring gear 5 by means of a claw spring.

On the inner peripheral face of the gear carrier 4 on the side of the drive member 3, there is provided an internal gear 41 meshable with a gear 61 mounted on an end portion of the outer periphery of the relay member 6. Further, on the outer periphery opposite to the drive member 3, there is supported the fourth transmission claw 10, with the claw 10 being urged toward the ratchet 22 by means of a claw spring.

On the inner peripheral face of the ring gear 5 on the side of the drive member 3, there is provided a ratchet 52 engageable with the second transmission claw 8. On the opposite side of the inner peripheral face of the ring gear 5, there is provided the internal gear 51. At a longitudinal intermediate position thereof, the third transmission claw 9 is supported, with the claw 9 being urged towards the ratchet 21 by means of a claw spring.

On the outer peripheral face of the relay member 6 on the side of the drive member 3, there is provided a ratchet 62 engageable with the first transmission claw 7. At an intermediate position of the outer peripheral face, there is formed a control face which comes into contact with a leg portion of the third transmission claw 9 opposed to its claw portion during the axial movement for controlling the third transmission claw 9.

The clutch 20 is constructed as a cylindrical member having a large diameter portion and a small diameter portion divided across a stepped portion. On a face of the large diameter portion opposing to the transmission claw 7, there is formed a cam face. Also, on an inner periphery of the small diameter portion, there is provided a stopper portion engageable with the key 30 for stopping rotation.

Figure 5:
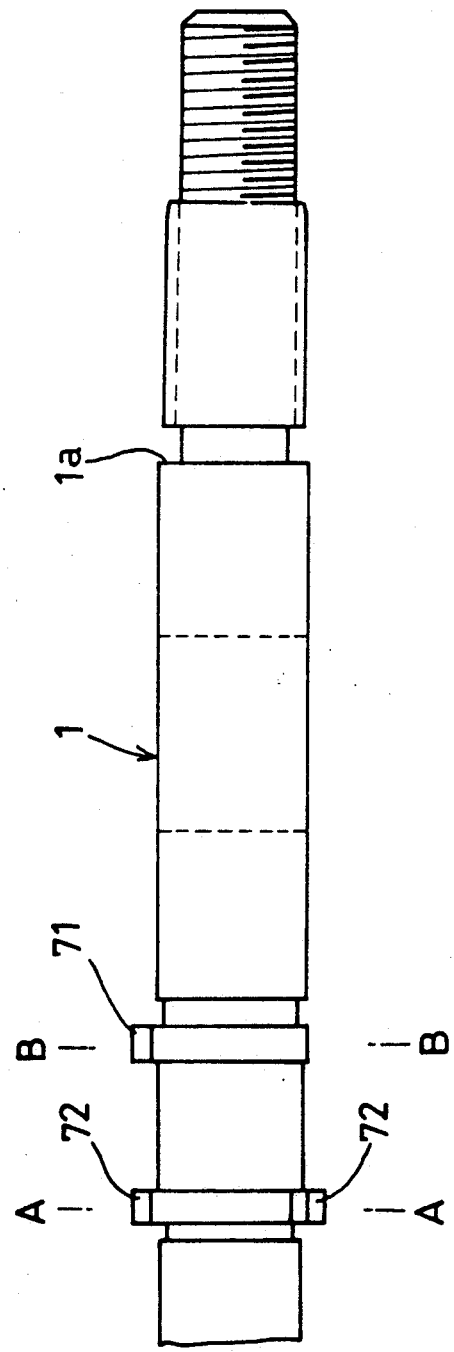
FIG. 5 is a partially cutaway front view showing a fixed shaft alone.
Figure 7:
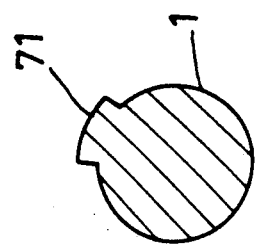
FIG. 7 is a section view taken along a line B—B of FIG. 5.
Figure 6:
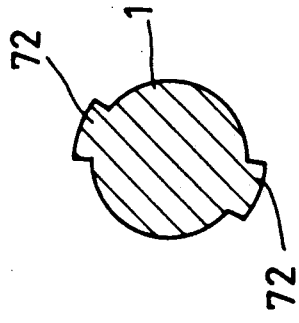
FIG. 6 is a section view taken along a line A—A of FIG. 5.

Further, the fixed shaft 1 rotatably mounts, at axially different intermediate positions thereof, a first sun gear 11 and a second sun gear 12. Both the sun gears have a cylindrical shape and define teeth on its outer periphery and the first sun gear 11 is larger in diameter than the second sun gear 12. On the other hand, the gear carrier 4 rotatably mounts a first planet gear 13 meshable with the first sun gear 11 and a second planet gear 14 meshable with the second sun gear 12, with the first planet gear 13 being smaller in diameter than the second planet gear 14. At axially different positions of the outer peripheral face of the fixed shaft 1, as illustrated in FIGS. 5 through 7, there are provided a first regulating projection 71 and a second regulating projection 72.

On the inner peripheral face of the first sun gear 11, there are provided two pairs of first lock claws 73 engageable with the first regulating projection 71, with the two claws 73 of each pair having leading ends directed in opposite directions. Similarly, on the inner peripheral face of the second sun gear 12, there are provided two pairs of second lock claws 74 engageable with the second regulating projection 72, with the two claws 74 of each pair having leading ends directed in opposite directions. These first and second regulating projections 71, 72 and the first and second lock claws 73, 74 together constitute a lock control mechanism 70 for selectively locking and releasing the sun gears 11 and 12 relative to the fixed shaft 1. On the outer periphery of the fixed shaft 1, there is rotatably mounted a control member 80 which is operable externally of the hub body 2. This control member 80 includes a first control portion 81 for controlling the clutch 20, a second control portion 82 for causing the lock control mechanism 70 to lock the first sun gear 11 to the fixed shaft 1 and a third control portion 83 for locking the second sun gear 12 to the fixed shaft 1. Then, with a rotational operation on this control member 80, both the selection of the transmission channel and also that of the sun gears to be locked to the fixed shaft can be readily effected for providing a plurality of speeds.

Further, the first sun gear 11 and the second sun gear 12 are rotatable relative to each other. Also, the lock claws 73 and 74 supported to the inner peripheral faces of the respective sun gears 11, 12 are urged to the outer peripheral face of the fixed shaft 1 by means of the claw springs. Incidentally, these two pairs of the lock claws 73 and 74 can be substituted by one pair for each.

The first planet gear 13 and the second planet gear 14 are formed integrally with each other and are supported to the gear carrier 4 through a single common shaft. Further, the first planet gear 13 is meshed with the internal teeth 51 of the ring gear 5.

The control member 80 has a length extending from one distal end of the fixed shaft 1 to a portion of the shaft 1 carrying the second regulating projection 72. Also, the control member 80 is loosely, i.e. rotatably mounted on the fixed shaft 1.

On a distal end of the control member 80, there is provided a disc-shaped control portion 84 having a stopper portion for stopping an end of a speed-change control cable. At the other end of the member 80, there are provided the second and third control portions 82 and 83. Moreover, at intermediate positions of the control member 80, there are provided the first control portion 81 and an elongated inserting slot 85 for receiving the key 30.

Figure 15:
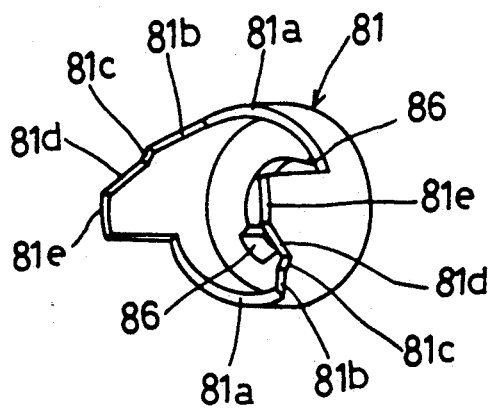
FIG. 15 is a perspective view of a first control portion.

The first control portion 81, as best shown in FIG. 15, includes a first cam face 81a, a second cam face 81b continuous with the first cam face, a third cam face 81d continuous with the second cam face 81b through a stepped portion 81c therebetween, and a fourth cam face 81e, with the first through fourth cam faces and the stepped portion being dispersed peripherally in said order. The first cam face 81a is formed normal to the axis of the fixed shaft 1. Further, this first control portion 81 is formed independently of a cylindrical body 80a having the control portion. Specifically, the control portion 81 is formed as a cylindrical member including a radially extending, disc-shaped flange portion and a cylindrical portion extending axially from one end of the flange portion. This cylindrical control portion 81 includes, in its inner peripheral face, a pair of opposed engaging grooves 86, 86 engageable with fork portions 80g (to be described later) of the cylindrical body 80a, such that the first control portion 81 is unrotatably connected with the cylindrical body 80a.

Figure 2:
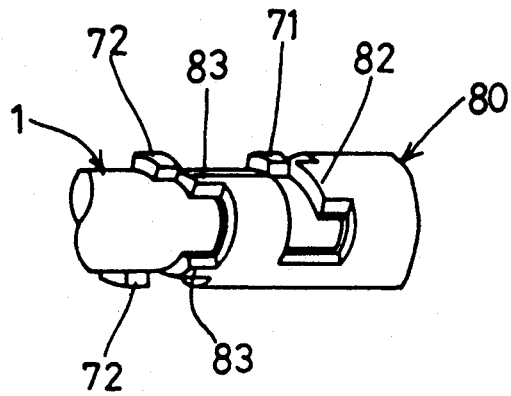
FIG. 2 is a perspective view showing only control portions and lock control portions of a control member used in the hub of FIG. 1.
Figure 3:
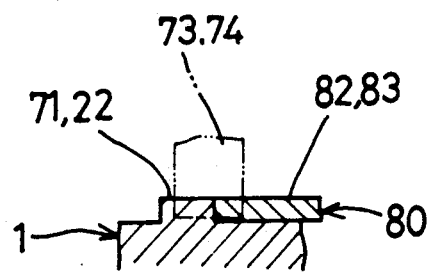
FIG. 3 is a section view of FIG. 2, FIGS. 4(a) through 4(d) are views illustrating a relationship between the control member and a lock control mechanism.

The second and third control portions 82 and 83 are formed as axially extending projections comprised of partial cutouts of the cylindrical body 80a. More particularly, as illustrated in FIG. 2 and also in FIGS. 8 through 12, at the leading end of the cylindrical body 80a, there are formed a peripheral groove 80b extending in the peripheral direction and a plurality of axial grooves 80c extending from the peripheral groove 80b toward the control portion 84. Thus, the projecting portions between these grooves 80b and 80c constitute the second control portion 82. On the other hand, there are formed a plurality of axial grooves 80d extending from the leading edge of the cylindrical body 80a to the control portion 84. Then, the projections between these grooves 80d constitute the third control portion 83. Also, there is formed a communicating groove 80e extending from the peripheral groove 80b to the leading edge, so that the first regulating projection 71 is positioned in the peripheral groove 80b. Then, as the peripheral groove 80b receives the first regulating projection 71, as shown in FIGS. 2 and 3, the first regulating projection 71 and the second control portion 82 are axially aligned with each other. Further, as the second regulating projection 72 is positioned externally of the leading edge of the cylindrical body 80a, as shown in FIGS. 2 and 3, the second regulating projection 72 and the third control portion 83 are axially aligned with each other. Consequently, the first lock claws 73 are engageable with the first regulating projection 71 and the second control portion 82; whereas, the second lock claws 74 are engageable with the second regulating projection 72 and the third control portion 83. Then, by varying the peripheral positions of the second and third control portions 82 and 83 relative to the respective regulating projections 71 and 72, the respective lock claws 73 and 74 are controlled as illustrated in FIGS. 4(a) through 4(e).

Figure 8:
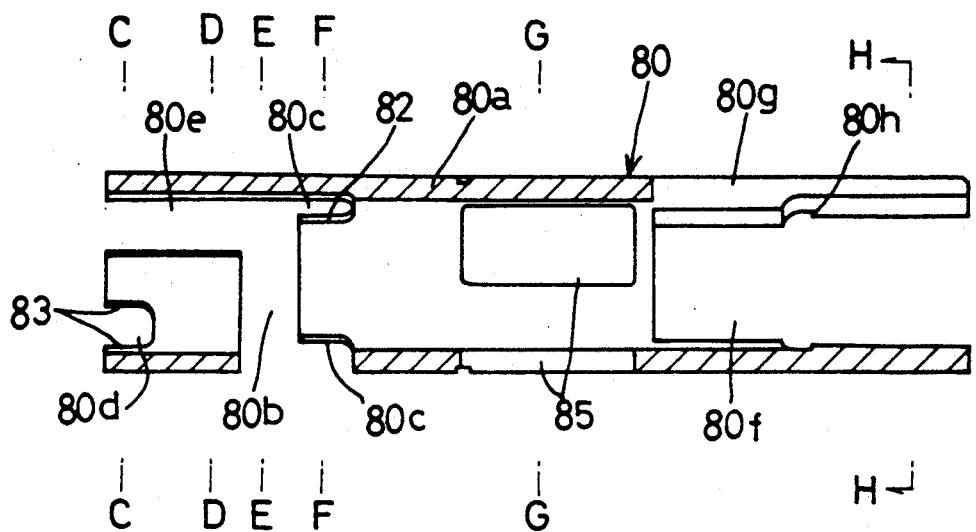
FIG. 8 is a section view of the control member.
Figure 9:
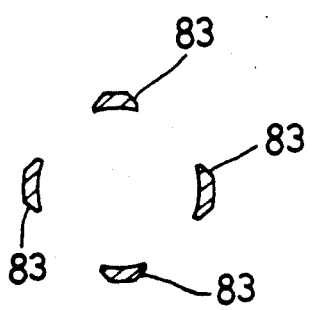
FIG. 9 is a section view taken along a line C—C of FIG. 8.
Figure 10:
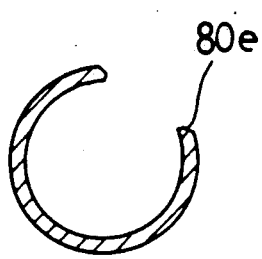
FIG. 10 is a section view taken along a line D—D of FIG. 8.
Figure 11:
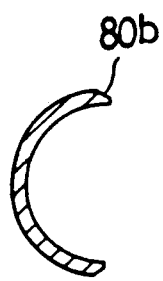
FIG. 11 is a section view taken along a line E—E of FIG. 8.
Figure 12:
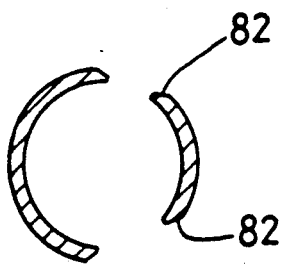
FIG. 12 is a section view taken along a line F—F of FIG. 8.
Figure 13:
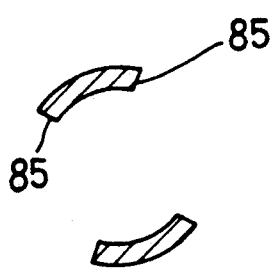
FIG. 13 is a section view taken along a line G—G of FIG. 8.
Figure 14:
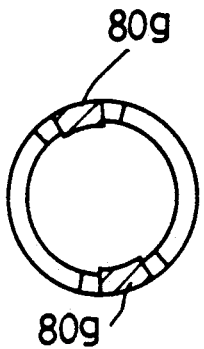
FIG. 14 is a section view taken along a line H—H of FIG. 8.

On the side of the control portion 84, as shown in FIGS. 8, 13 and 14, the control member 80 is forked shaped. Specifically, the control member 80 includes, at this portion thereof, a pair of axially extending slits 80f and a pair of the fork portions 80g formed between the slits 80f. Further, at an intermediate inner portion of each fork portion 80g, there is formed an abutment 80h which comes into abutment against a stepped portion 1a formed on the fixed shaft 1 for limiting the axial movement of the control member 80.

Figure 16:
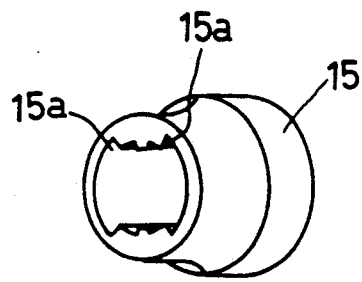
FIG. 16 is a perspective view of a ball pushing element.

A ball pushing element 15 is provided for supporting the drive member 3 to the fixed shaft 1. In an inner peripheral face of this ball pushing element 15, as shown in FIG. 16, there is formed a peripherally extending guide groove 15a. Then, as the fork portion 80g is inserted into the guide groove 15 along the engaging groove 86, the control member 80 is held rotatable relative to the ball pushing element 15. Incidentally, the ball pushing element 15 is axially slidably yet unrotatably fitted on the fixed shaft 1.

Figure 17:
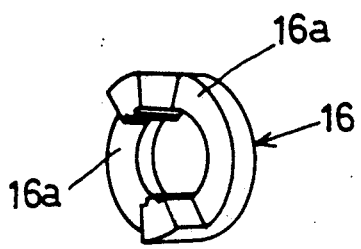
FIG. 17 is a perspective view of a spacer.
Figure 18:
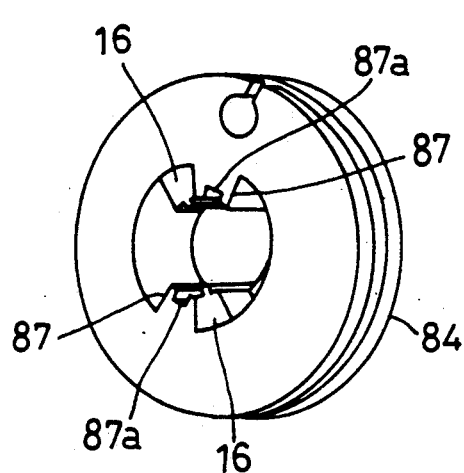
FIG. 18 is a perspective view of a control portion.

The control portion 84 is formed independently of the cylindrical body 80a. On the inner peripheral face of the control portion 84, as shown in FIG. 18, there are a pair of projections 87 including engaging grooves 87a into which the leading ends of the fork portions 80g are engaged. Further, on the inner side of this control portion 84, there is provided a spacer 16 having a peripheral guide groove 16a for guiding the projection 87 (see FIG. 17), so that this spacer 16 is only axially movable relative to the fixed shaft 1.

In this embodiment, between the drive member 3 and the relay member 6, there is provided a projectable/retractable fifth transmission claw 17 for transmitting rotational force of the drive member 3 through the relay member 6 to the gear carrier 4 when the drive member 3 is rotated in the reverse direction. The hub body 2 includes, in its inner periphery, a braking face 23. Whereas, the gear carrier 4 includes, in its end periphery, a cam face 42. Further, between this cam face 42 and the braking face 23, there is provided a braking shoe 18, as a braking element, radially movable via a rotary member, so that the reverse rotation of the drive member 3 activates the shoe 18 for braking.

Figure 19A:
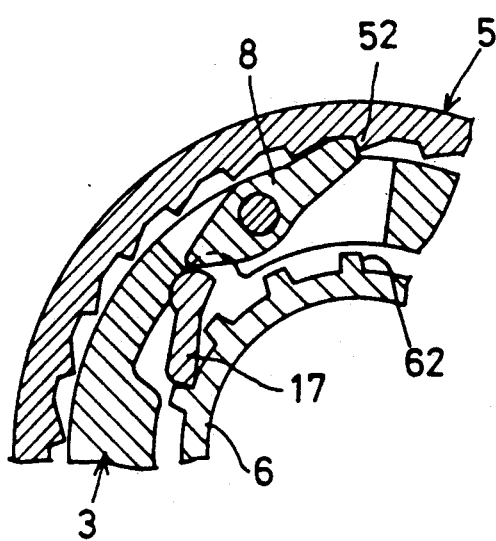
FIGS. 19(a) and 19(b) are views illustrating engagement/disengagement relationship among a clutch, a drive member and a ring gear when the drive member is rotated in a reverse direction.
Figure 19B:
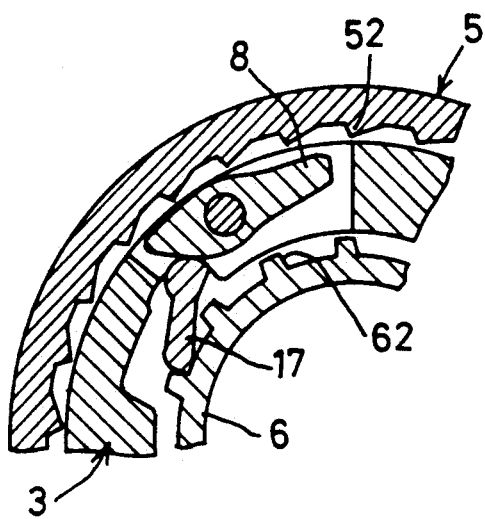

In this case, as illustrated in FIG. 19, with the reverse rotation of the drive member 3, the fifth transmission claw 17 as one transmission claw becomes engaged with a reverse tooth formed at an intermediate position of the outer peripheral face of the relay member 6. Then, the second transmission claw 8 as the other transmission claw supported to the drive member 3 becomes depressed as the claw end of this claw 8 supported to the drive member 3 comes into contact with the fifth transmission claw 17, so that the depressed second transmission claw 8 breaks the power transmission between the drive member 3 and the ring gear 5. That is, when the drive member 3 is rotated in the forward direction, i.e. the driving direction, as illustrated in FIG. 19(a), the fifth transmission claw 17 becomes engaged with the drive member 3 and the second transmission claw 8 becomes engaged with the ring gear 5. Conversely, when the drive member 3 is rotated in the reverse direction, i.e. the braking direction, as illustrated in FIG. 19(b), the fifth transmission claw 17 comes into contact with the second transmission claw 8 to break power transmission between the drive member 3 and the ring gear 5.

In FIG. 1, a reference numeral 19 denotes a return spring for returning the control member 80. A numeral 40 denotes a return spring for returning the clutch 20. By means of this return spring 40, the clutch 20 is engaged with the first control portion 81 via the key 30. Further, a reference numeral 50 denotes a return spring for returning the relay member 6. A numeral 60 denotes a control ring unrotatably supported to the inner peripheral face of the hub body 2 and for depressing the third transmission claw 9 when the drive member 3 is rotated in the reverse direction.

Functions and operations of the speed-change hub having the above-described characterizing construction of the invention will be particularly described next.

In the condition shown in FIG. 1, the speed-change hub is in the highest speed stage. In this condition, the clutch 20 and the relay member 6 are located at their rightmost positions. The first lock claws 73 of the lock control mechanism 70 are controlled by the second control portion 82 so that the claws 73 are engaged with the first regulating projection 71 (see FIG. 4(b)) thereby to lock the first sun gear 11 against rotation. As the first transmission claw 7 engages with the ratchet 62 of the relay member 6, the power from the drive member 3 is transmitted via the first transmission claw 7 and the relay member 6 to the gear carrier 4. Then, this power transmitted to the gear carrier 4 is further transmitted via the first planet gear 13 to the ring gear 5 and the third transmission claw 9 engaged with the first ratchet 21 to consequently the hub body 2 for rotating the same at the top speed.

In the above operation, the second planet gear 14 is rotated in the same direction as the first planet gear 13. However, since the rotational speed transmitted from the second planet gear 14 to the second sun gear 12 is lower than that transmitted from the first planet gear 13 to the ring gear 5, as illustrated in FIG. 14(a), the second sun gear 12 is rotated in the opposite direction to that of the force acting on the first sun gear 11, the second sun gear 12 is not locked.

Further, in the above operation, the second transmission claw 8 becomes engaged with the ratchet 52 of the ring gear 5. However, since the rotational speed transmitted from the gear carrier 4 to the ring gear 5 is higher than that transmitted from the drive member 3 via the second transmission claw 8 to the ring gear 5, the second transmission claw 8 only slides.

Figure 4A:
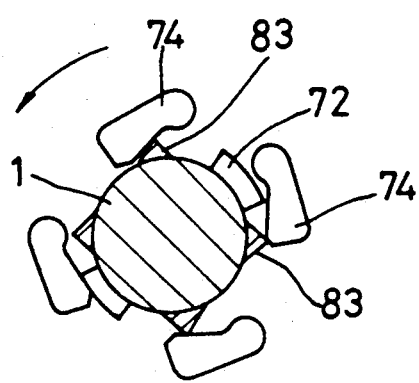
Figure 4B:
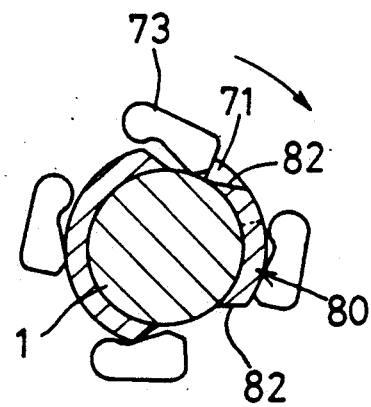
Figure 4C:
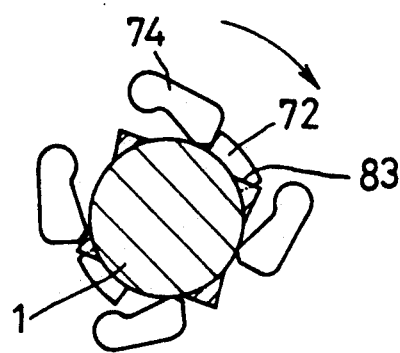
Figure 4D:
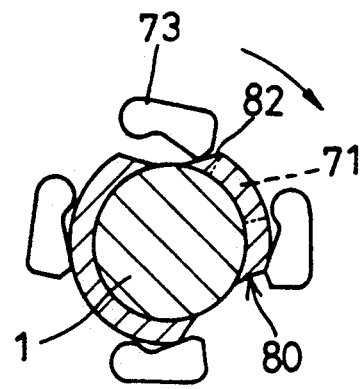
Figure 4E:
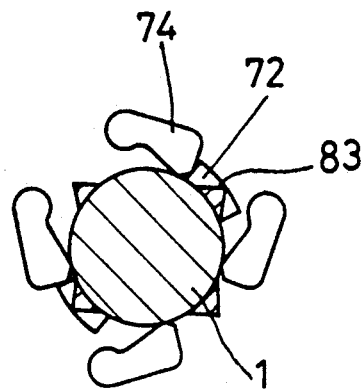

For effecting a change speed operation from the above-described top speed stage to a second highest speed stage, the control member 80 is rotated so that, as illustrated in FIG. 4(c), the third control portion 83 causes the second lock claw 74 of the lock control mechanism 70 to come into engagement with the second regulating projection 72 thereby to lock the second sun gear 12 against rotation. Further, the second control portion 82 acts to release the engagement between the first lock claw 73 and the first regulating projection 71 as shown in FIG. 4(d) thereby to release the locked condition of the first sun gear 11.

Accordingly, the power transmitted through the first transmission claw 7, the relay member 6 and the gear carrier 4 is further transmitted via the second planet gear 14, the ring gear 5 and the third transmission claw 9 to consequently the hub body for rotating the same at the second highest speed. Incidentally, in the above operation, the key 30 engaged with the first control portion 81 effects only a peripheral displacement along the first cam face 81a of the first control portion 81 and the clutch 20 does not effect axial movement. Also, in the above speed-change operation, the second transmission claw 8 comes into engagement with the ratchet 52 of the ring gear 5. However, since the rotational speed transmitted from the gear carrier 4 to the ring gear 5 is higher than that transmitted from the drive member 3 via the second transmission claw 8 to the ring gear 5, similarly to the foregoing case, the second transmission claw 8 only slides.

For effecting a speed-change operation from the above second highest speed stage to the middle speed stage, the control member 80 is further rotated for causing the second cam face 81b of the first control portion 81 to move the clutch 20 toward the gear carrier 4 so that the cam face of the clutch 20 depresses the first transmission claw 7 to break the power transmission from the drive member 3 to the relay member 6. Accordingly, the power of the drive member 3 is transmitted via the second transmission claw 8, the ring gear 5 and the third transmission claw 9 to consequently the hub body 2 for rotating the same at the middle speed. In this case, as illustrated in FIG. 4(c), the third control portion 83 causes the second lock claw 74 of the lock control mechanism 70 to come into engagement with the second regulating projection 72 thereby to lock the second sun gear 12 against rotation.

Figure 4F:
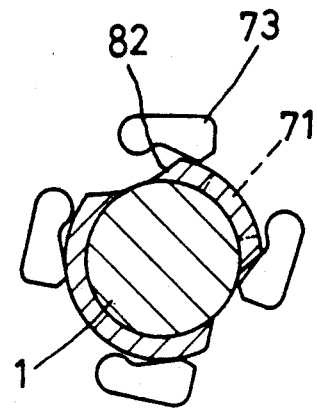

Also, in the above operations, the second control portion 82 acts as shown in FIG. 4(f) to release the engagement between the first lock claw 73 and the first regulating projection 71, whereby the locked condition of the first sun gear 11 is released.

The intermediate stepped portion of the clutch 20 is placed in contact with the terminal edge of the relay member 6.

Figure 4G:
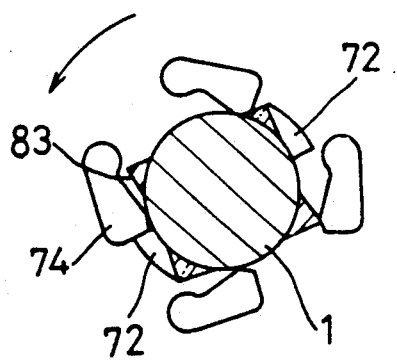
Figure 4H:
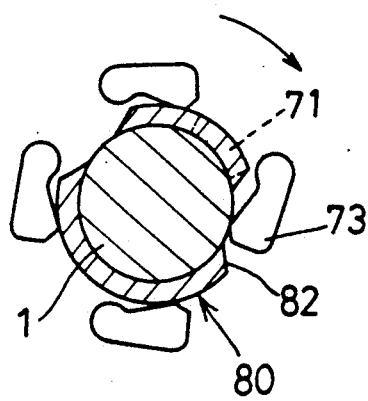

For effecting a speed-change operation from the above middle speed stage to the second lowest speed, the control member 80 is further rotated to cause the third cam face 81d of the first control portion 81 to move the clutch 20 further toward the gear carrier 4. Further, as illustrated in FIG. 4(g), the third control portion 83 causes the second lock claw 74 of the lock control mechanism 70 to come into engagement with the second regulating projection 72 thereby to lock the second sun gear 12 against rotation. Also, the second control portion 82 acts as shown in FIG. 4(h) to release the engagement between the first lock claw 73 and the first regulating projection 71 thereby to release the first sun gear 11. Accordingly, with the above movement of the clutch 20, the relay member 6 moves toward the gear carrier 4 and the outer peripheral control face of this relay member 6 depresses the third transmission claw 9 to break the power transmission from the ring gear 5 to the hub body 2. Thus, the power of the drive member 3 is transmitted via the second transmission claw 8, the ring gear 5, the second planet gear 14, the gear carrier 4 and the fourth transmission claw 10 consequently to the hub body 2 for rotating the same at the second lowest speed.

In the above operation, the first planet gear 13 rotates in the same direction as the second planet gear 14. However, since the rotational speed transmitted from this first planet gear 13 to the first sun gear 11 is lower than that transmitted from the ring gear 5 to the second planet gear 14, the first planet gear 13 rotates in the opposite direction to that of the force acting on the second sun gear 12, whereby the first sun gear 11 is not locked.

Figure 4I:
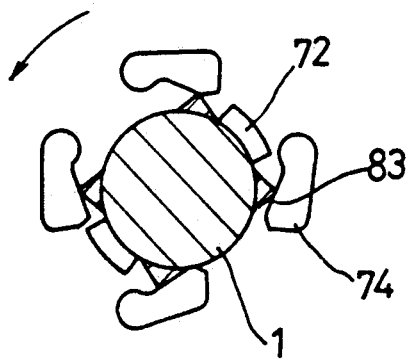
Figure 4J:
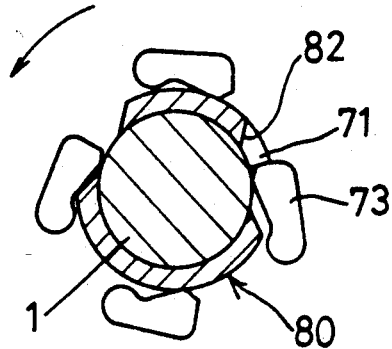

For effecting a speed-change operation from the above second lowest speed stage to the lowest speed stage, the control member 80 is further rotated to cause the second control portion 82, as illustrated in FIG. 4(j), to bring the first lock claw 73 of the lock control mechanism 70 into engagement with the first regulating projection 71 thereby to lock the first sun gear 11 against rotation. Further, as shown in FIG. 4(i) the third control portion 83 acts to release the engagement between the second lock claw 74 and the second regulating projection 72 thereby to release the second sun gear 12. Accordingly, the power transmitted from the drive member 3 via the second transmission claw 8 to the ring gear 5 is further transmitted via the first planet gear 13, the gear carrier 4 and the fourth transmission claw 10 consequently to the hub body 2 for rotating the same at the lowest speed. Incidentally, in the above operations, the key 30 engaged with the first control portion 81 effects only a peripheral displacement along the fourth cam face 81e continuous with the third cam face 81d of the first control portion 81 and the clutch 20 does not move in the axial direction.

The above-described various transmission channels are summarized in the table below, in which a circle mark denotes an active state of each claw, a cross mark denotes an inactive state of the claw where the claw is released from engagement by the clutch 20 and the control portions 81 through 83. A triangular mark denotes a partial engagement of the claw where the claw is only partially engaged in the power transmission and effects a sliding movement due to a speed difference.

|  | 73 claw | 74 claw | 7 claw | 8 claw | 9 claw | 10 claw |
| --- | --- | --- | --- | --- | --- | --- |
| highest | ○ | △ | ○ | △ | ○ | △ |
| 2nd highest | X | ○ | ○ | △ | ○ | △ |
| middle | X | ○ | X | ○ | ○ | △ |
| 2nd lowest | △ | ○ | X | ○ | X | ○ |
| lowest | ○ | X | X | ○ | X | ○ |

In the foregoing embodiment, the speed-change hub is designed to provide five speeds including two high speeds, a middle speed and two low speeds. Instead, the hub can be designed to provide three speeds including two high speeds and one middle speed, or two low speeds and one middle speed, or the hub can be designed to provide four speeds including two high speeds and two low speeds.

In the foregoing embodiment, two sun gears are employed. Instead, the specific number of sun gears can vary conveniently.

Further, the operations of the control member 80 by the control portion 84 are effected from one direction in the foregoing embodiment. Alternately, it is also conceivable for the operations to be effected from the two opposite directions, i.e. the right and left directions. For this modified arrangement, for example, in FIG. 1, it is conceivable to arrange the lock claw 73 of the first sun gear 11 so that it is controlled by the control portion disposed at the right side of FIG. 1 while the lock claw 74 of the second sun gear 12 is controlled by the further control portion disposed at the left side of FIG. 1.

Figure 20:
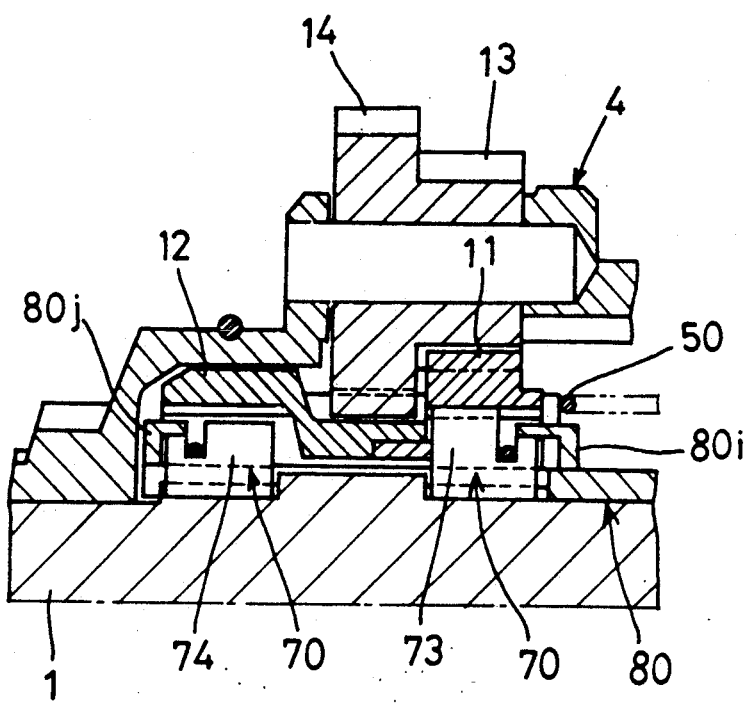
FIG. 20 is a partially enlarged front view showing a modified arrangement of the lock control portions.
Figure 21:
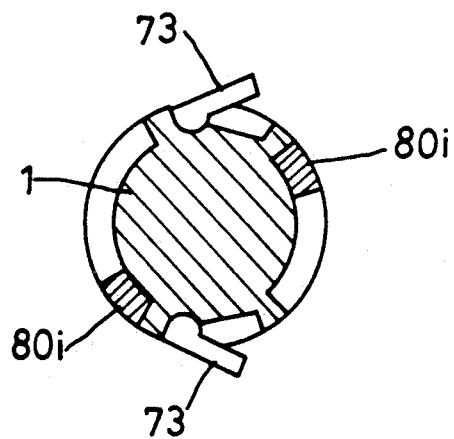
FIG. 21 is a section view showing only a fixed shaft, lock claws and sleeves of the arrangement of FIG. 20.

Further, in the foregoing embodiment, the lock claws 73 and 74 are supported respectively to the first and second sun gears 11 and 12. Instead, as illustrated in FIGS. 20 and 21, these lock claws can be supported respectively to the fixed shaft 1. In this case, the control operations of these lock claws relative to the sun gears are effected by means of sleeves 80i and 80j provided to the control member 80, respectively.

Figure 22:
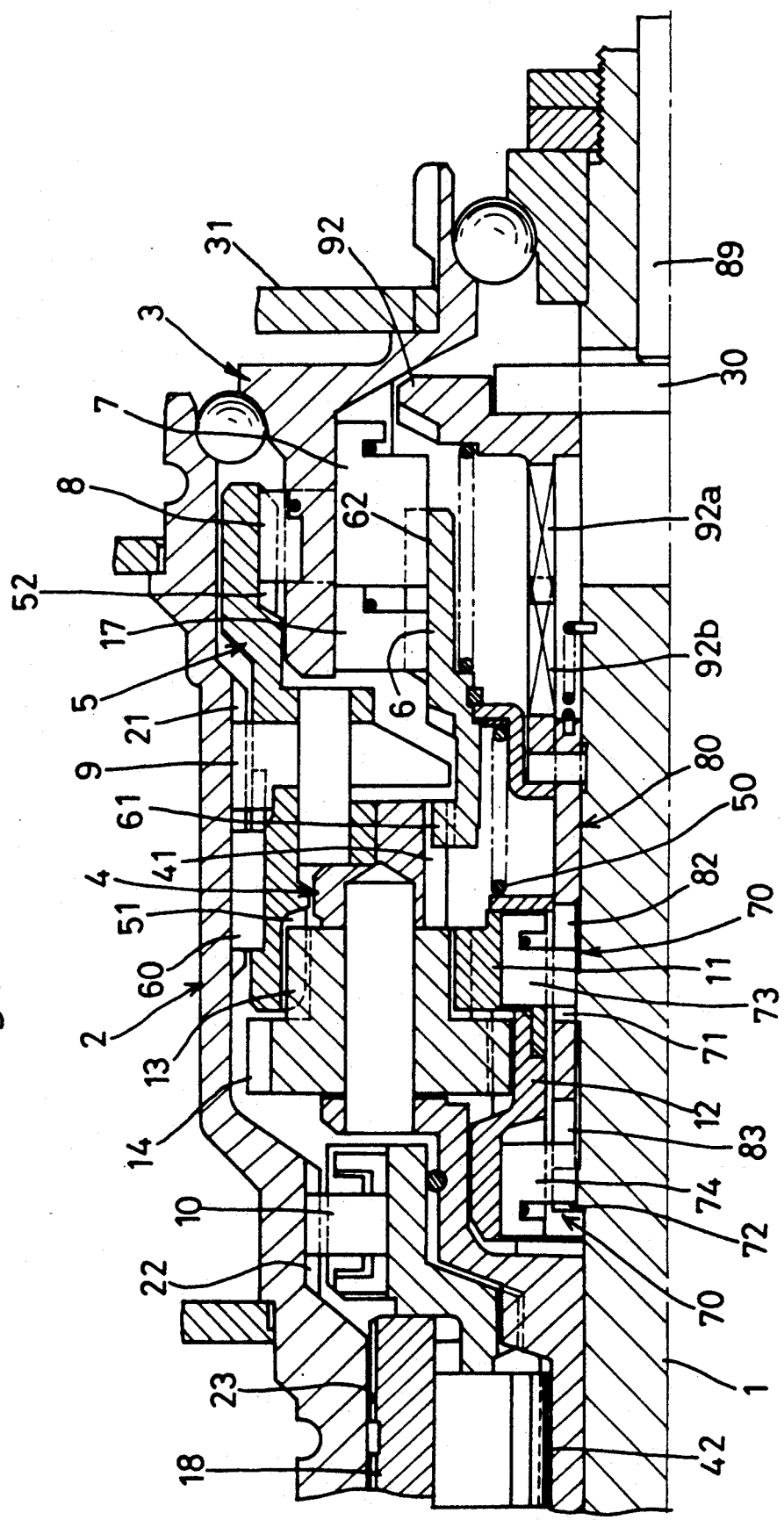
FIG. 22 is a partial front view showing a clutch and a control member according to a still further modified arrangement.

Moreover, the speed-change operations by using the control portion can vary in many other ways than those described in the foregoing embodiment. For instance, as illustrated in FIG. 22, the speed-change operations can be effected by operating a control bar 89 along the fixed shaft 1. In this case, as shown in FIG. 1, instead of moving the clutch 20 through the rotation of the first control portion 81 having a plurality of cam faces displaced peripherally of the fixed shaft relative to each other, the control bar 89 acts in place of the first control portion 81. Then, by moving this control bar 89 along the axis of the fixed shaft 1, two separate clutches 92 are selectively moved for operating the control member 80. More specifically, by pushing the control bar 89 in the axial direction, a rear poriton 92a of the clutch 92 is pushed via the key 30 and then a front portion 92b having a cam face of the clutch 92 and directly connected with the control member 80 is rotated. That is, this front portion 92b, when pushed by the clutch rear portion 92a, rotates about the fixed shaft 1 together with the control member 80.

The above axial operation of the control bar 89 is carried out by the user's operation of an unillustrated speed-change lever directly connected via a control cable with a bell crank (not shown) for pushing and pulling the control bar 89. Then, when the control bar 89 is pushed, the clutch 92 is pushed via the key 30 and then the control member 80 is rotated. Thus, in this modified construction, the control portion 84 such as illustrated in FIG. 1 is not necessary.

Figure 23:
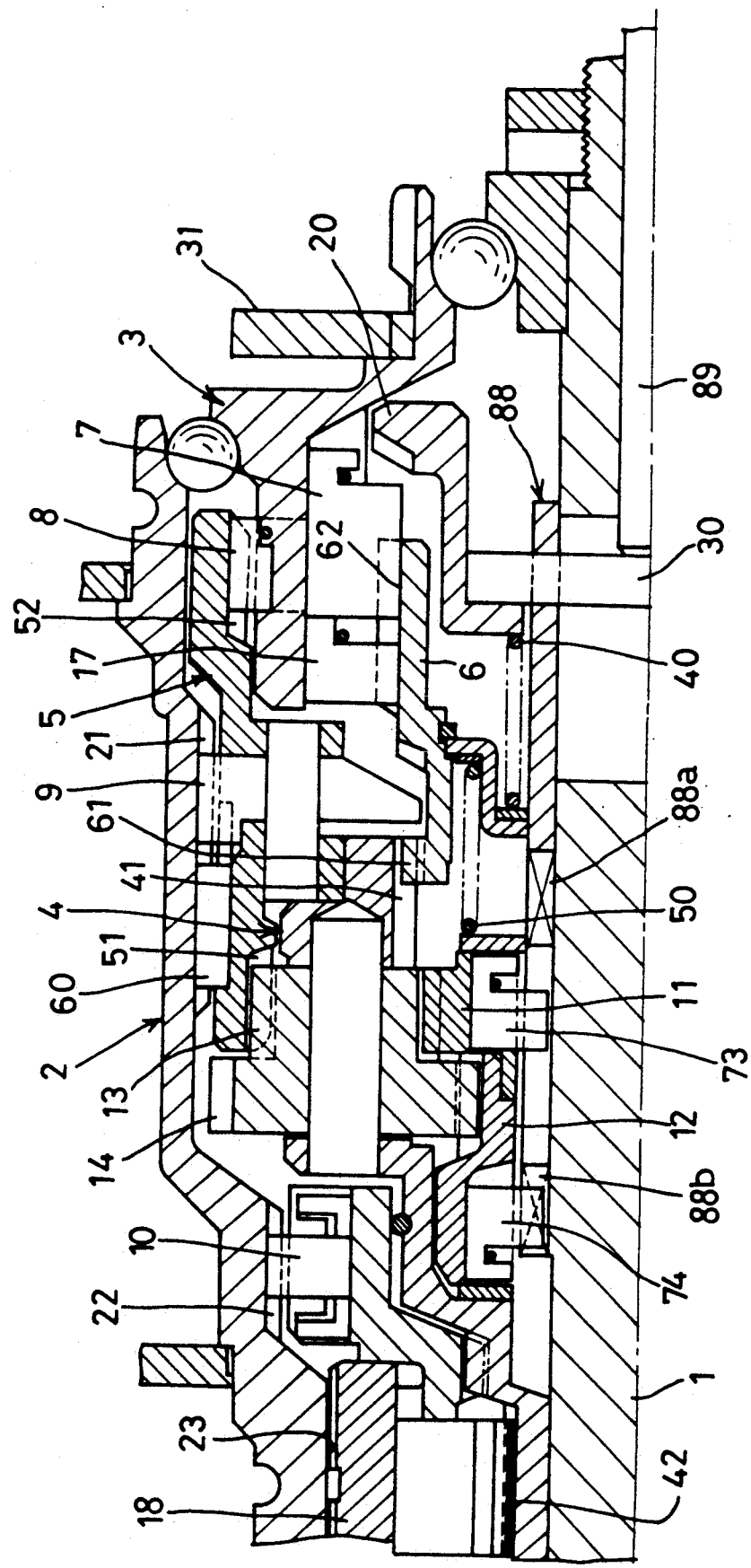
FIG. 23 is a partial front view showing a further modified arrangement of the clutch and the control member.

Further, as illustrated in FIG. 23, it is also conceivable that the axial movement of the control member 88 having cam faces 88a, 88b forwardly thereof causes engagement and disengagement of the lock claws 73 and 74 supported to the respective sun gears. That is, the axial pushing operation of the control bar 89 pushes the clutch 20 via the key 30 against the urging force of the return spring 40 and simultaneously therewith the control member 88 effects an axial movement to engage or disengage the lock claws 73 and 74. This modified construction is advantageous for its simpleness, since the clutch and the control member are not rotatably operated.

Further, if the user can effect the speed-change operations by such straight line motions rather than the rotary motions, the user can benefit from greater easiness in the operations.

The construction of the ball pushing element 15 can also vary in many ways. In its construction illustrated in FIG. 1, the element 15 includes a ball receiving face in its inclined outer peripheral face and a plurality of balls are peripherally dispersed and received in the receiving face so that the balls per se are movable in the peripheral direction. In place of this, for example, it is conceivable to define a plurality of recesses in the ball receiving face of the element 5 for receiving the balls while limiting peripheral movements of the same.

Further, according to the braking construction described in the foregoing embodiment, the reverse rotation of the drive member 3 causes the fifth transmission claw 17 as the one transmission claw to come into contact with the second transmission claw 8 supported to the drive member 3 as the other transmission claw for depressing this second transmission claw 8 thereby to break the power transmission from the drive member 3 to the ring gear 5. However, this operation for breaking the power transmission between the drive member 3 and the ring gear 5 can be carried out in many other ways.

Figure 24:
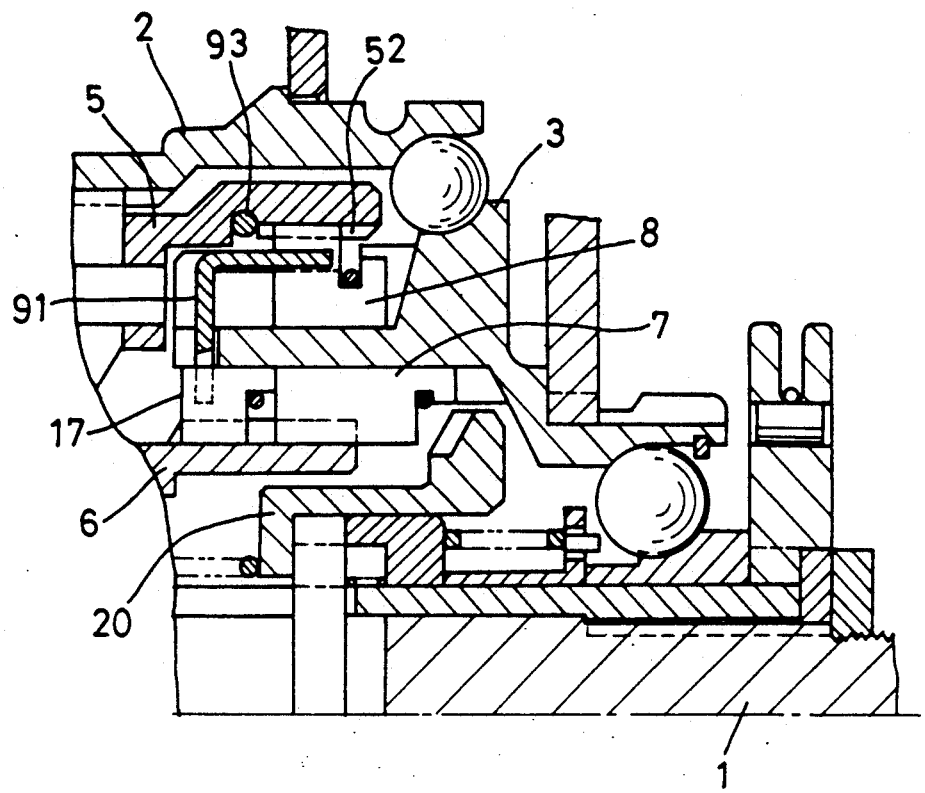
FIG. 24 is an enlarged front view showing a ring gear and a drive member of a modified arrangement when the drive member is rotated reversely.
Figure 25A:
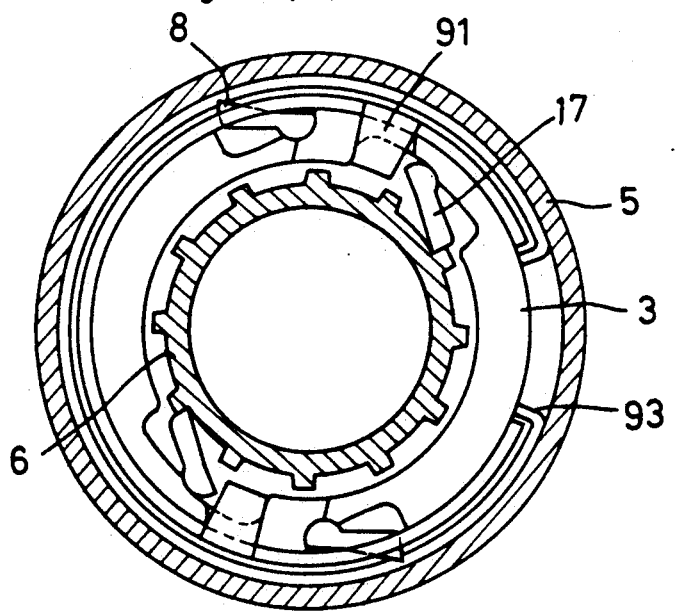
FIGS. 25(a) and 25(b) are views showing the ring gear being engaged with the drive member through a transmission claw.
Figure 25B:
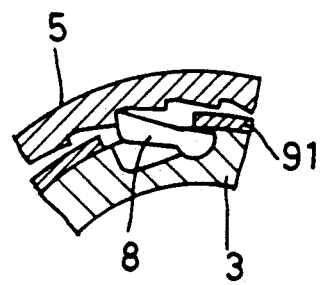
Figure 26A:
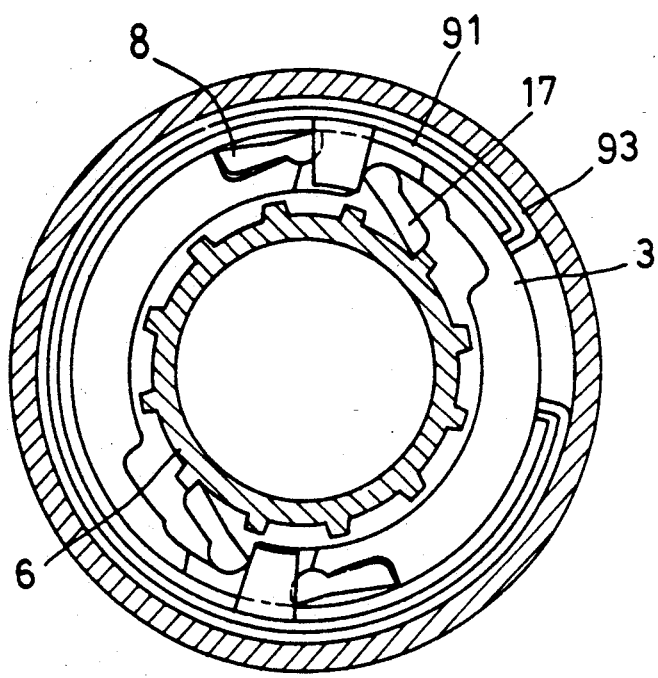
FIGS. 26(a) and 26(b) are views showing a condition where the ring gear and the drive member break the power transmission.
Figure 26B:
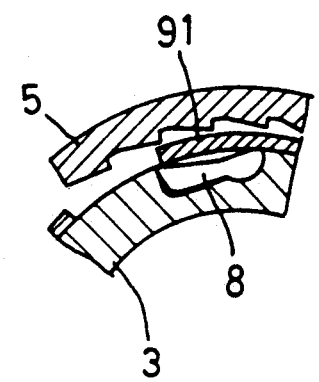

For instance, as illustrated in FIGS. 24 through 26, a claw cage 91 is attached to an intermediate portion on the outer peripheral face of the drive member 3 and also a slide spring 93 is attached to the ring gear 5. So that, the claw cage 91 is moved via the fifth transmission claw 17 to come into contact with the second transmission claw 8 for depressing the same.

After a braking operation in the middle or low speed stages, the second transmission claw 8 is returned in the following manner. That is, when the drive member 3 is rotated in the forward direction, i.e. the driving direction, this drive member 3 per se effects free rotation relative to the ring gear 5. However, as shown in FIGS. 25 and 26, since the claw cage 91 is unmovable because of the slide spring 93 fitted on the ring gear 5, there occurs mutual rotation between the claw cage 91 and the drive member 3 thereby to return the second transmission claw 8. Incidentally, when the drive member 3 and the ring gear 5 are rotated relative to each other as in the high speed stages, the claw cage 91 is placed in abutment against the drive member 3 and therefore the slide spring 93 slides relative to the ring gear 5.

The operation for breaking the power transmission between the drive member 3 and the ring gear 5 can be effected still alternately as described below.

Figure 27:
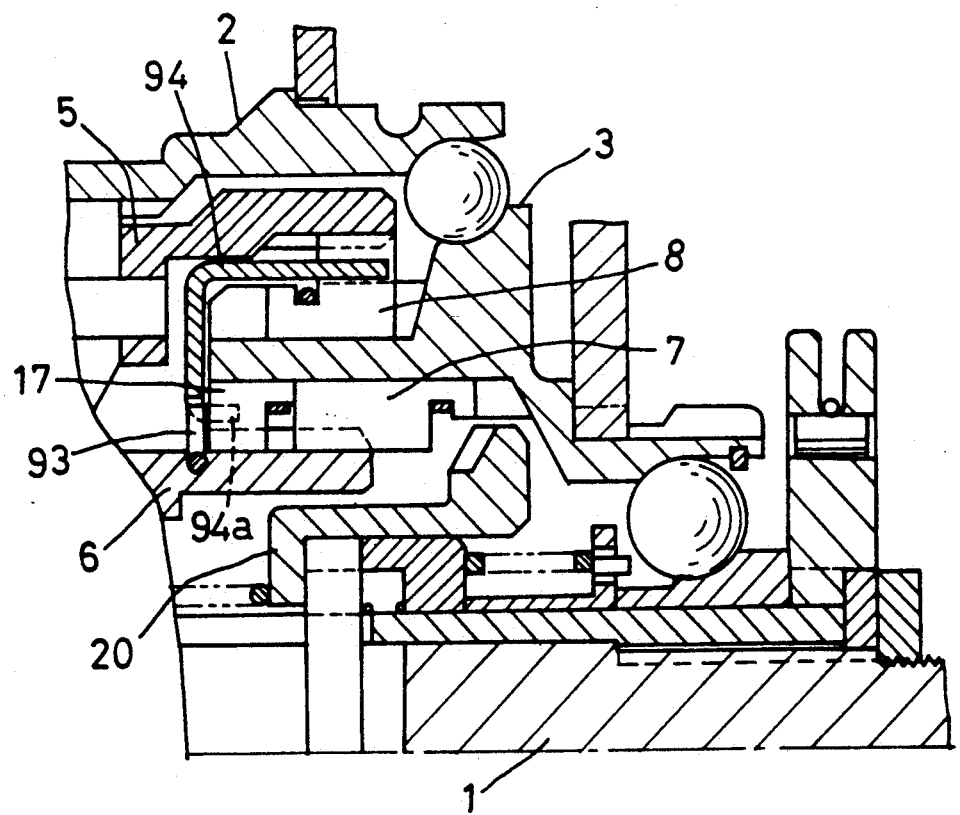
FIG. 27 is a partially enlarged front view showing a ring gear and a drive member of a still further modified arrangement when the drive member is rotated reversely.
Figure 28A:
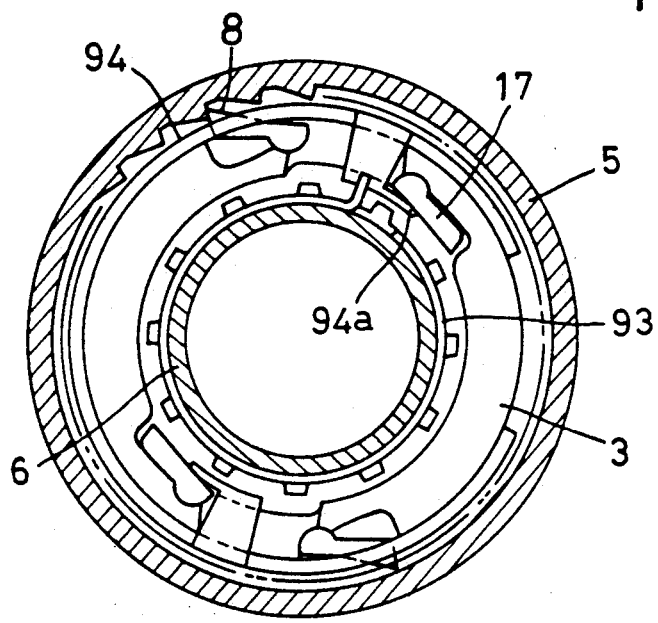
FIGS. 28(a) and 28(b) are views showing the ring gear being engaged with the drive member through a transmission claw.
Figure 28B:
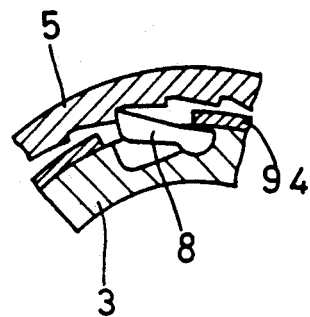
Figure 29A:
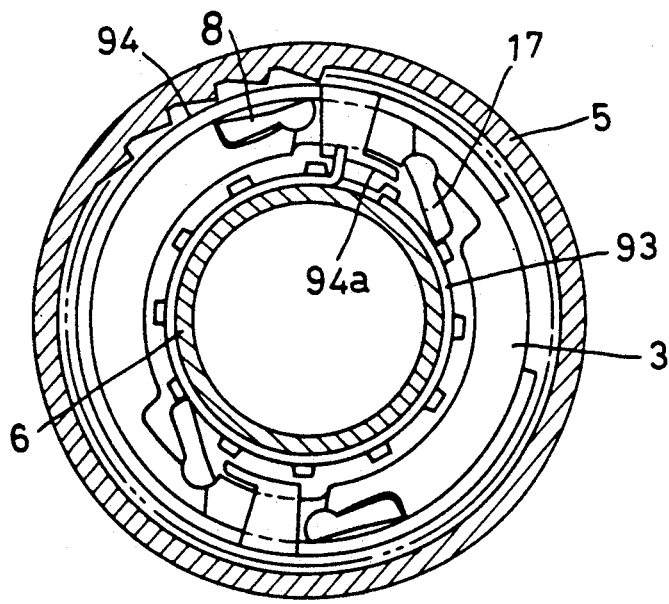
FIGS. 29(a) and 29(b) are views showing a condition where the ring gear and the drive member break the power transmission.
Figure 29B:
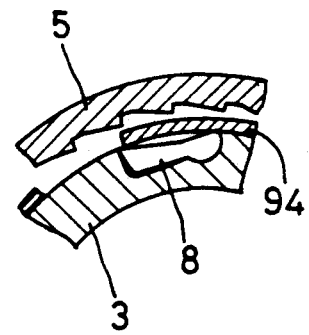

In this further modified construction, as shown in FIG. 27, the slide spring 93 is fitted on the relay member 6 so as to limit movement of the claw cage 94 having a guide portion 94a projecting from the leading end of its claw portion. This construction effects the same functions as that shown in FIG. 24. In this case, when the drive member 3 is rotated in the braking, i.e. reverse direction, the drive member 3 effects a free rotation relative to the relay member 6. On the other hand, since the claw cage 94 has its movement limited by the slide spring 93, the cage 94 is rotated ralative to the drive member 3. Accordingly, the fifth transmission claw 17, as shown in FIG. 29(a), causes the drive member 3 to come into engagement with the relay member 6 while the second transmission claw 8, as shown in FIG. 29(b), acts to release the engagement between the drive member 3 and the ring gear 5 thereby to break the power transmission between the drive member 3 and the ring gear 5. Incidentally, in the middle and low speed stages, the operations will occur in the opposite manners to those described above. That is, as shown in FIG. 28(b), the second transmission claw 8 causes the drive member 3 and the ring gear 5 to come into engagement with each other and acts also to release the engagement between the drive member 3 and the ring gear 5 as shown in FIG. 28(a).

In the above construction, the slide spring 93 is fitted on the relay member 6. Alternately, as shown in FIG. 24, the slide spring 93 can be fitted on the ring gear 5.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A braking construction used in a speed-change hub, said construction comprising:
   a fixed shaft;
   a hub body and a drive member rotatably supported by the fixed shaft, respectively;
   a power transmission for transmitting a drive force from the drive member to the hub body when the drive member is rotated in a driving direction;
   a braking mechanism having a braking member for braking rotation of the hub body when the drive member is rotated in a reverse direction relative to said driving direction of rotation;
   a brake control claw supported by a member cooperating with the drive member, said brake control claw engaging with a first member associated with the braking member when the drive member is rotated in the reverse direction to thereby rotate the first member in the reverse direction in unison with the member cooperating with the drive member;
   a second member rotated in the reverse direction at higher angular speed than the first member when the first member is rotated in the reverse direction;
   a transmission claw supported by said member cooperating with the drive member for engaging with the second member when the drive member is rotated in the driving direction to thereby rotate the second member in the driving direction of rotation with the member cooperating with the drive member; and
   disengaging means for forcibly disengaging the transmission claw from the second member when the drive member is rotated in the reverse direction by an interaction between the transmission claw and the brake control claw.

2. A braking construction as claimed in claim 1, wherein said disengaging means allows the brake control claw to abut the transmission claw when the drive member is rotated in the reverse direction to forcibly disengage the transmission claw from the second member.

3. A braking construction as claimed in claim 2, wherein said power transmission includes a planetary gear mechanism having a gear carrier and a ring gear, wherein said first member forms a relay member rotatable in unison with said gear carrier and said second member forms said ring gear, and wherein said member supporting the respective claw forms a part of the drive member per se.

4. A braking construction as claimed in claim 1, wherein said disengaging means is provided with a claw cage rotatable in the driving direction with respect to the member cooperating with the drive member, said disengaging means allowing said brake control claw to abut the transmission claw when the drive member is rotated in the reverse direction to forcibly disengage the transmission claw.

5. A braking construction as claimed in claim 4, wherein said power transmission includes a planetary gear mechanism having a gear carrier and a ring gear, wherein said first member forms a relay member rotatable in unison with said gear carrier and said second member forms said ring gear, wherein said member supporting the transmission claw forms a part of the drive member per se, and wherein said ring gear includes a slide spring fitted therein for attaching said claw cage to the drive member to restrict movement of the claw cage.

6. A braking construction used in a speed-change hub, said construction comprising:
   a fixed shaft;
   a hub body and a drive member rotatably supported by the fixed shaft, respectively;
   a power transmission for transmitting a drive force from the drive member to the hub body, when the drive member is rotated in a driving direction;
   a braking mechanism having a braking member for braking rotation of the hub body when the drive member is rotated in a reverse direction relative to said driving direction;
   a brake control claw supported by a member cooperating with the drive member for engaging with a first member associated with the braking member when the drive member is rotated in the reverse direction to thereby rotate the first member in the reverse direction with the drive member;
   a second member rotated in the reverse direction at higher angular speed than the first member when the first member is rotated in the reverse direction; and
   a transmission claw supported by a member cooperating with the drive member for engaging with the second member when the drive member is rotated in the driving direction to rotate the second member in the driving direction with the drive member;
   disengaging means for disengaging the transmission claw from the second member when the drive member is rotated in the reverse direction, said disengaging means including a claw cage relatively rotatable in the driving direction with respect to the member cooperating with the drive member to forcibly disengage the transmission claw from the second member and to cause the brake control claw to engage with the second member, said claw cage being restricted in rotation with respect to at least one of the first and the second member.

7. A braking construction as claimed in claim 6, wherein said power transmission includes a planetary gear mechanism having a gear carrier and a ring gear, wherein said first member forms a relay member rotatable in unison with the gear carrier and said second member forms said ring gear, said member for supporting the respective claws forms a part of the drive member per se, and wherein rotation of said claw cage is restricted with respect to at least one of the first and the second member by a slide spring fitted into at least one of the first and the second member.

8. A speed-change hub comprising:
a fixed shaft;
a hub body and a drive member rotatably supported by said fixed shaft, respectively;
a power transmission for transmitting a drive force from said drive member to the hub body, said power transmission mechanism comprising:
a plurality of rotatable planetary gears,
a plurality of sun gears meshing with said plurality of planetary gears, respectively, and having diameters differing from each other, said sun gears being rotatable independently from said fixed shaft and being substantially limited in axial movement;
a lock control mechanism for locking and unlocking said plurality of sun gears with respect to said fixed shaft, and
a control member for externally controlling said lock control mechanism to provide a plurality of speeds by selecting among said sun gears to be locked,
said lock mechanism including engaging portions disposed between said fixed shaft and the respective sun gears, and lock claws engageable with said engaging portions,
said control member being relatively rotatable with respect to the fixed shaft at least in the vicinity of said sun gears, said control member including a plurality of control portions for contacting said lock claws corresponding to a position of relative rotation between the control member and the fixed shaft to select engagement or disengagement between the lock claws and the engaging portions.

9. A speed-change hub as claimed in claim 8, wherein each of said plurality of control portions includes a plurality of stepped areas peripherally distributed about said fixed shaft, said control portions being rotatable in unison with the control member.

10. A speed-change hub as claimed in claim 9, wherein said lock claws are pivotable about an axis along a longitudinal direction of said fixed shaft and urged to engage with said engaging portions, said lock claws restricting the respective sun gears to rotate in one direction relative to said fixed shaft.

11. A speed-change hub as claimed in claim 10, wherein said engaging portions of said lock control mechanism include limiting projections defined about the fixed shaft, and wherein said lock claws are mounted on an inner periphery of the respective sun gears.

12. A speed-change hub as claimed in claim 11, further comprising a clutch for switching said power transmission and a first control portion for controlling said clutch with operation of said control member, wherein said lock control mechanism includes two lock claws mounted on the sun gears, respectively, said lock claws having extreme ends oriented in opposite directions to each other so that rotation of the sun gears relative to the fixed shaft is limited in different directions.

13. A speed-change hub as claimed in claim 12, wherein said control member can externally control the control portions to be rotatable in unison therewith,
wherein said clutch switches said power transmission by moving in the longitudinal direction of said fixed shaft, and
wherein said first control portion is provided with cam faces for moving said clutch in an axial direction of the fixed shaft by rotation of the control member.

14. A speed-change hub as claimed in claim 13, further comprising a support member disposed between the fixed shaft and the drive member for supporting the drive member to the fixed shaft, and a guide groove defined between the support member and the fixed shaft, said control member being provided with a fork portion extending through said guide groove and being rotatable relative to the support member.

15. A speed-change hub comprising:
a fixed shaft;
a hub body and a drive member rotatably supported by said fixed shaft, respectively;
a power transmission for transmitting a drive force from said drive member to said hub body;
a support member disposed between the fixed shaft and the drive member for supporting the drive member to the fixed shaft; and
a control member rotatably operable relative to the fixed shaft for externally effecting a speed change operation through said power transmission,
said support member and said fixed shaft having a guide groove defined therebetween,
said control member being provided with a fork portion extending through said guide groove and being relatively rotatable with respect to said support member.

16. A speed-change hub as claimed in claim 15, wherein said support member is a ball-pushing member and has the guide groove defined in an inner periphery thereof, the support member being nonrotatably engaged with the fixed shaft.

* * * * *